US006208738B1

(12) United States Patent
Goldenfeld et al.

(10) Patent No.: US 6,208,738 B1
(45) Date of Patent: Mar. 27, 2001

(54) INTERFACE BETWEEN TWO PROPRIETARY COMPUTER PROGRAMS

(75) Inventors: Nigel David Goldenfeld, Urbana, IL (US); Dmitri Linde, Stanford, CA (US); Alexander Sokol, Champaign, IL (US)

(73) Assignee: Numerix Corp., New York, NY (US)

( * ) Notice: Subject to any disclaimer, the term of this patent is extended or adjusted under 35 U.S.C. 154(b) by 0 days.

(21) Appl. No.: 08/800,471

(22) Filed: Feb. 14, 1997

(51) Int. Cl.[7] ......................................................... H04L 9/00
(52) U.S. Cl. ............................................... 380/287; 380/30
(58) Field of Search .................................. 380/9, 30, 287; 364/717.01; 707/103

(56) References Cited

U.S. PATENT DOCUMENTS

| 4,833,633 | * | 5/1989 | Morris ............................ 364/717.01 |
| 5,799,312 | * | 8/1998 | Rigoutsos ............................. 707/103 |
| 5,802,525 | * | 9/1998 | Rigoutsos ............................. 707/103 |

FOREIGN PATENT DOCUMENTS 9707475  2/1997  (WO) .

OTHER PUBLICATIONS

Quasi–Monte Carlo Methods in Numerical Finance, Corwin Joy, Phelim P. Boyle, Ken Seng Tan, Jun. 6, 1996, Management Science/vol. 42, No. 6.

Quasi–Monte Carlo Integration, William. Morokoff and Russel E. CaFlisch Journal of Computational Physics (1995).

* cited by examiner

Primary Examiner—Salvatore Cangialosi
(74) Attorney, Agent, or Firm—Mayer, Brown & Platt

(57) ABSTRACT

A method and system for accelerating an integral evaluation program using the Monte Carlo evaluation by sequence generation program without disclosing the internal workings and functionality of the programs. More specifically, the present invention uses a sequence generation program to generate a point in a sequence. An integral evaluation program calculates the integrand at that point and passes the result to the sequence generation program. Based on this sample, the sequence generation program generates further points in the sequence based on the integrand but without revealing specific information about the sequence. The sequence is used by the integral evaluation program to solve the integral without revealing the details of the sequence generation program.

48 Claims, 3 Drawing Sheets

INTERFACE BETWEEN TWO PROPRIETARY COMPUTER PROGRAMS

FIELD OF INVENTION

The present invention relates in general to a method of accelerating an integral evaluation computer program with an acceleration program without disclosing the internal execution and functionality of the programs. More specifically, the present invention is an interface which allows a program to evaluate a secret integral by the Monte Carlo method using a sequence of numbers provided by a sequence generation program while protecting the secrecy of the sequence generation program.

BACKGROUND OF INVENTION

The Monte Carlo method provides approximate solutions to mathematical problems by performing statistical sampling calculations on a computer. The method was developed originally during the middle 1940's as part of research for the atomic bomb program at Los Alamos. It can be used for problems which are inherently probabilistic and for problems that are apparently deterministic. An example of the former is the simulation of random neutron diffusion in a nuclear reactor. An example of the latter is the calculation of the energy levels of a quantum system. The Monte Carlo method is a standard tool in the science and finance fields. An overview of the Monte Carlo method which includes detailed explanations of the examples above is M. H. Kalos and P. A. Whitlock, "Monte Carlo Methods Volume I: Basics," pp. 7–37 (Wiley, New York, 1986).

The Monte Carlo method is widely used for many applications in scientific research, applied technology and finance. These include but are not limited to: simulation of the thermal properties of materials such as magnets and superconductors; simulation of the properties of industrially important polymer molecules such as polyethylene and proteins; the valuation of derivative securities such as interest rate derivatives or mortgage-backed securities; the estimation of the risk inherent in a portfolio of diverse financial instruments such as stocks, bonds, commodities and options; and the generation of realistic three-dimensional graphical images.

In such applications and others, the Monte Carlo method is used to estimate a statistical quantity appropriate for the application: typically this is an average value of a quantity computed with respect to a known probability distribution. The Monte Carlo method can also be used to provide estimates of the value of integrals of any dimension. The output from all of the calculations described above is usually either displayed on a computer screen or printed.

In the case of financial applications, such as interest-rate derivatives or mortgage backed securities, the Monte Carlo method is used because the complexity of the transactions and cash flows in the specification of the derivative security in question prevents the use of known alternative, faster methods of derivative valuation. Indeed, it is a generally held view that the Monte Carlo method is the most dependable and versatile technique at the disposal of practitioners in financial derivatives, and one robust enough so it may always be used if alternative techniques fail for any reason.

In many cases of practical interest, it is possible to equate the results of the Monte Carlo method to the solution of an appropriate differential equation associated with the statistical properties of the application of interest. When this can be done, it is advantageous if the speed of calculation is important to the user, because the differential equation is typically solvable by so-called lattice or finite-difference methods, known to those skilled in the art. In the particular context of financial applications, these lattice methods are known as tree methods, and are described by Jon C. Hull, "Options, Futures and Other Derivative Securities, 2d. Ed.," Chpt. 14 (Prentice Hall, Englewood Cliffs, 1993). The tree methods and the Monte Carlo method are completely equivalent mathematically, but differ in the manner of implementation.

Monte Carlo problems are typically formulated as multi-dimensional integrals, which without loss of generality can be taken to be over a unit hypercube. For example, the value of a derivative security can be represented as an integral over a multi-dimensional unit cube, as shown by S. H. Paskov and J. F. Traub, *Journal of Portfolio Management*, pp. 113–120, (Fall 1995). The dimension of the cube is determined by the underlying stochastic processes and the number of discrete time intervals involved in the specification of the derivative security.

The evaluation of an integral by the Monte Carlo method is performed by (i) choosing a number, N, of points at random in the multi-dimensional cube; (ii) evaluating the integrand at those points; and (iii) averaging the value of the integrand at those points to obtain the estimate of the integral. Thus the Monte Carlo estimate of the integral:

$$I = \int f(x) d^D x$$

of a function f(x), where x is a point in a D-dimensional hypercube, is given by the large N limit of:

$$I = (1/N) \sum_{i=1}^{N} f(x_i)$$

where the sum runs from i=1 to N and $x_1$ is a sequence of random points in the D-dimensional hypercube. In present integrations performed on a digital computer, the points are chosen from a pseudo-random sequence generation program, such as those provided with many compilers. An example is the "rand ()" function provided with draft compliant ANSI C++ language.

Monte Carlo problems can also be formulated directly as simulations of the underlying stochastic process. For example, as is well known to those skilled in the art, and explained by John C. Hull, "Options, Futures and Other Derivative Securities 2d. Ed.," pp. 330–331 (Prentice Hall, Englewood Cliffs, 1993), the behavior of a stock price over time is sometimes modeled as random fluctuations superimposed on a steadily increasing average price. The time series for the change in value of the stock at the end of the day over a particular set of (e.g. 360) consecutive trading days constitutes a realization or particular scenario of the random price movements. In the following 360 day period the time series for the stock price movements would follow a different scenario. A derivative security whose value is some predetermined function of the stock price will have a value at the end of each 360 day period which in general depends upon the entire time series for the stock during each scenario. The average value for the derivative security 360 days from a given date can be calculated by simulating on a computer a large number N (e.g. 10,000) scenarios of the stock price movement which are statistically consistent with the known behavior or model of the stock price, calculating the value of the derivative security at the end of each scenario, and averaging the results. In this example, this procedure would be mathematically equivalent to performing a multidimensional integral in 360 dimensions.

The procedures described above will converge to the correct result if N is sufficiently large, but the rate of convergence is relatively slow. For example, the root-mean-square-error between the estimate after N points and the correct result decreases in proportion to $1/\sqrt{N}$, independent of the dimension of the cube. In financial derivatives, some securities may require values of N as large as 10 million in order to achieve satisfactory accuracy. Such large calculations can take several hours on a personal computer having a Pentium type processor. Such lengthy time delays prevent derivative dealers from providing clients with real-time prices for these securities and thus may result in lost sales or trading opportunities and may also result in trades that are not based on real time information.

Thus, it is desirable to improve the rate of convergence of the estimate to obtain real-time pricing solutions. It has been found that this may be accomplished by replacing the pseudo-random sequence of points with an alternative sequence of points with appropriate properties. Deterministic sequences which cover the multi-dimensional cube more efficiently than pseudo-random sequences exist, and are generically termed low-discrepancy sequences. Examples of low-discrepancy sequences in the public domain include the Halton sequence, the Sobol sequence and the Faure sequence, all of which have been used to some extent to improve multi-dimensional integration. A detailed account of these developments is given by W. J. Morokoff and R. E. Caflisch, "Quasi-Monte Carlo Integration", 122 *J. Comp. Phys.* 218–230 (1995).

The low discrepancy sequences are determined purely by the dimension of the space, with such sequences being independent of the integrand. Integration using these sequences results in a convergence that varies approximately in proportion to 1/N for a large enough N. Thus, the use of the low discrepancy sequences can reduce calculation times. However, such times are still sometimes inadequate to meet the needs of rapidly changing financial transactions.

Other sequences also exist which can improve the convergence of Monte Carlo simulation. These sequences are valuable due to their superiority to low discrepancy sequences in accelerating integral evaluation programs and are often proprietary. Proprietary sequences may be generated in one of two ways: (i) in a manner independent of the integrand, or (ii) in a manner that is adapted in some way to the integrand. Such sequences are termed non-adaptive and adaptive, respectively. Non-adaptive sequences improve the convergence of the Monte Carlo simulation in a generic way: they work regardless of the integrand. Adaptive sequences improve the convergence of Monte Carlo simulation by exploiting the properties of the actual integrand. Thus, adaptive sequences potentially provide a much greater enhancement than non-adaptive sequences, because they construct a sequence specially targeted towards the integrand of interest.

The enhancement provided by adaptive techniques is potentially more consistent across different security types than that provided by non-adaptive techniques. This is because adaptive techniques are able to select the part of a sequence where the largest contributions to an integral are made and thus focus the sequence on these points. A non-adaptive method must provide points across the entire sequence. An example of a non-adaptive proprietary sequence is that used by IBM in its "Deterministic Simulation Blaster" (see P. Truel, "From IBM: Help in Intricate Trading," New York Times, Sep. 25, 1995). An example of an adaptive proprietary sequence is that used by NumeriX LLC in its C++ object-oriented software library.

In addition to evaluating integrals, the Monte Carlo method can be used to estimate the risk of a particular portfolio. The commonly accepted measure of risk is known as "Value-at-Risk." Over a predetermined time interval, and with a specified probability distribution for the independent random factors that determine the value of a portfolio of securities (e.g., foreign exchange rates, interest rates, stock prices, and others), the Value-at-Risk is the maximum loss that a portfolio would suffer with a given confidence level. The confidence level is often 95%; thus, in a particular instance, it might be said that a certain portfolio has a Value-at-Risk of U.S. $10 million at the 95% confidence level for the next day. This would imply that over the next day, there is a one-in-twenty chance that the portfolio would lose more than U.S. $10 million.

Value-at-Risk is calculated by the Monte Carlo method. A number, N, of scenarios are generated at random. Each scenario is a vector whose components are the random factors determining the value of the portfolio. The portfolio is evaluated at the scenarios, and a histogram of values is created. From the histogram, the present value of the portfolio can be subtracted, so that the histogram describes the profit and loss of the portfolio over the time period in question; i.e. the histogram records how many scenarios corresponded to a given amount of change in the value of the portfolio. Integrating this distribution allows one to determine the loss value which 5% of the scenarios exceed. This is the desired Value-at-Risk. A detailed account of the use of this measure in practice is given by P. Jorion, "Value at Risk," Chpt. 12 (Irwin, Chicago, 1996).

Both public-domain and proprietary non-adaptive sequences have been used to evaluate derivative securities. The results of the use of such sequences have been documented by several authors such as R. E. Caflisch and W. J. Morokoff "Valuation of Mortgage Backed Securities Using the Quasi-Monte Carlo Method," Proc. Stanford Conference on Computational Finance (August 1996); S. Paskov and J. F. Traub "Faster Valuation of Financial Derivatives," *Journal of Portfolio Management,* 113–120, Fall (1995).

Development of proprietary sequence generation programs can be expensive and time consuming as the integrand must be analyzed to determine what points in a sequence are most effective in accelerating the evaluation process. Such specially tailored sequence programs are difficult to obtain commercially because they require specific knowledge of the underlying integral evaluation program. The knowledge of the underlying integral evaluation program in the financial field is considered proprietary and thus not available.

A very commonly encountered situation is where a user owns a computer program which evaluates a particular derivative security by Monte Carlo simulation. However, the precise details of the security are proprietary in the sense that either the type of security being evaluated is confidential, or the assumptions of the derivative security model are proprietary. An example of the former situation is when a bank is trading a particular derivative security, but may not wish this fact to be known to other market participants. Secrecy in this case is desirable because the bank would seek to prevent other parties from imitating their trading strategy and thus potentially diminish its profitability.

An example of the latter situation is when a bank values interest-rate derivatives using a proprietary model for the term structure of interest rates. The better predictive power of such a model allows a bank to offer more competitive deals to clients. Such models are expensive to develop and can be, and generally are, treated as valuable trade secrets.

In addition, the bank's trading strategies may rely on its superior modeling of the yield curve for a particular derivative security.

Accelerating the computation of a valuation program using non pseudo-random sequences which do not jeopardize secrecy involves either: (i) using sequences that are in the public domain, or (ii) developing in-house sequences, which may be either non-adaptive or adaptive. The public domain sequences often do not achieve the desired level of acceleration because they cannot take advantage of the characteristics of the integrand. Developing in-house sequencing programs is expensive and time consuming, especially in view of the expense of developing the initial valuation program.

Other options jeopardize the secrecy of the proprietary valuation programs. These options include: (i) disclosing the proprietary valuation code to a party which is already in possession of proprietary sequences, or (ii) allowing the party in possession of proprietary sequences access to a public domain valuation code. As explained above, the first option is undesirable because it jeopardizes the secrecy of the valuation program. In the second case the improved code can be used for valuation purposes, but may not maximize the acceleration of the proprietary model. None of these alternatives preserves the confidentiality of the traded security's identity.

Developers of the sequence generation programs and the corresponding generated sequences face similar security concerns in selling or licensing their products. The sequence generation programs rely on development of proprietary theoretical understanding of valuation programs (hereinafter "models") which will result in generation of more efficient sequences. The proprietary models may be developed with knowledge of the general features of the valuation programs so that the sequence generation program may be provided to owners of different valuation programs with the same characteristics. In contracting with the owner of a valuation program, the owner of the sequence generation program may divulge the proprietary models and assumptions of its sequence generation models by supplying the sequence to the user of the valuation program. By learning this information, the owner of the valuation program may simply write their own sequence generation program, thus depriving the sequence generation program owner of an opportunity to sell the program.

In many cases of practical interest, it is possible to perform the desired calculation not only by the Monte Carlo method but also by the lattice method. The lattice method is generally faster than the Monte Carlo method, and so is frequently preferred in applications where the time of calculation needs to be as short as possible. For example, in financial applications, it is desirable to compute the price of derivative securities as quickly as possible so that derivative dealers might provide clients with real-time prices; any delay may result in lost sales or trading opportunities.

Lattice methods may also be accelerated by proprietary lattice acceleration programs. However, the same secrecy considerations apply as in the case of accelerating the Monte Carlo method. The party in possession of the proprietary lattice acceleration programs will not wish to disclose these to the user of the proprietary valuation program; and the user of the valuation program will not wish to disclose the proprietary elements of the valuation program to a third party such as the developer of the proprietary lattice acceleration programs.

Therefore, a need exists for a device which enables a party to accelerate its own proprietary valuation code using a proprietary sequence generation program developed by another party without disclosing the details of the valuation code. Furthermore, a need exists for a method to allow the interfacing of a valuation code with a sequencing program to accelerate computation. Also, a need exists for an interface which enables a sequence generation program which is adaptable to a wide variety of valuation programs to be used without disclosing the models underlying the sequence generation program.

SUMMARY OF THE INVENTION

The purpose and advantages of the present invention will be set forth in and apparent from the description that follows, as well as will be learned by practice of the invention. Additional advantages of the invention will be realized and attained by the methods and apparatus particularly pointed out in the written description as well as from the appended drawings.

It is one principal object of the present invention to enable a party to accelerate its own proprietary valuation code using a proprietary sequence generation program developed by another party, without requiring the disclosure of the sequence generation program. Another principal object of the present invention is to enable the proprietary valuation code to be accelerated by adaptive sequences generated by another party's proprietary sequence generation even though the valuation code is proprietary.

These objects and others are achieved by the present invention which is embodied in a method of accelerating an integral evaluation program with an acceleration program. The secrecy of the acceleration program is protected from a user of the evaluation program. A solution is generated from the acceleration program. The integral is then sampled by using the solution to solve the integral to obtain information relating to the integral. Further solutions are determined by using the information relating to the integral obtained by sampling the integral. A value is calculated for the integral based on the determined further solutions without disclosing the determined further solutions to the user of the evaluation program.

A system according to the present invention accelerates the evaluation of an integral with an acceleration program, while protecting the secrecy of the acceleration program from the system user is also disclosed. The system has a storage device having the acceleration program and a program for evaluating the integral. A processor is coupled to the storage device. The processor is configured to generate a solution from the acceleration program. The processor is configured to sample the integral by using the solution to solve the integral to obtain information relating to the integral. The processor is configured to determine further solutions by using the information relating to the integral obtained by sampling the integral. The processor is then configured to calculate a value for the integral based on the determined further solutions without disclosing the determined further solutions to the user of the evaluation program.

Further embodiments of the present invention are directed toward a method of accelerating an integral evaluation program having an integrand using the Monte Carlo method with a sequence generated by a sequence generation program having a sequence generation algorithm, while protecting the secrecy of the sequence generation program from a user of the evaluation program. A point is first determined in a sequence generated by the sequence generation program. The integrand is then evaluated at the point to produce an integrand value. A sequence of sample points is then determined by using the integrand value to obtain information about the integrand without revealing the integrand. The integrand is then evaluated using the sequence of sample points to produce corresponding integrand values without revealing the sequence of sample points to the user of the evaluation program. Finally, a resulting integral solution based on the evaluation of the integrand using the sequence of sample points is obtained.

A further embodiment of the present invention involves first utilizing a probe array to aid in determining the sequence. This embodiment determines a point in a probe sequence. The integrand is evaluated using the point in the probe sequence to produce an integrand value without revealing the integrand. Further sample points are then determined using the integrand value to obtain information about the integrand. The further sample points are then stored in a probe array.

As in the previous embodiment, the sequence is determined by the sequence generation program as a function of the probe array without revealing the sequence algorithm to the user of the evaluation program. A point in a sequence is generated by the sequence generation program. The integrand is then evaluated at the point to produce an integrand value and a sequence of sample points is determined by using the integrand value and probe array to obtain information about the integrand. The integrand is evaluated by using the sequence of sample points and the probe array to produce corresponding integrand values without revealing the sequence of sample points to the user of the evaluation program. A resulting integral solution is obtained based on the evaluation of the integrand using the sequence of sample points.

The present invention may be implemented in a system for accelerating an integral evaluation program having an integrand using the Monte Carlo method with a sequence generated by a sequence generation program having a sequence generation algorithm while preserving the secrecy of the sequence generation program from a user of the system. The system has a storage device storing the integral evaluation program and the sequence generation program. The system also includes an integrand evaluation circuit coupled to the storage device and configured by the integrand program. A sequence generation circuit is coupled to the storage device and is configured by the sequence generation program. The sequence generation circuit includes a circuit for determining a point in a sequence generated by the sequence generation program. The sequence circuit also includes an evaluation circuit coupled to the storage device.

The evaluation circuit produces an integrand value by using the determined point. The evaluation circuit then determines a sequence of sample points by using the integrand value to obtain information about the integrand without revealing the integrand. Finally, the evaluation circuit evaluates the integrand using the sequence of sample points to produce corresponding integrand values without revealing the sequence of sample points to the user of the evaluation program.

It is to be understood that both the foregoing general description and the following detailed description are not limiting but are intended to provide further explanation of the novel invention claimed herein. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
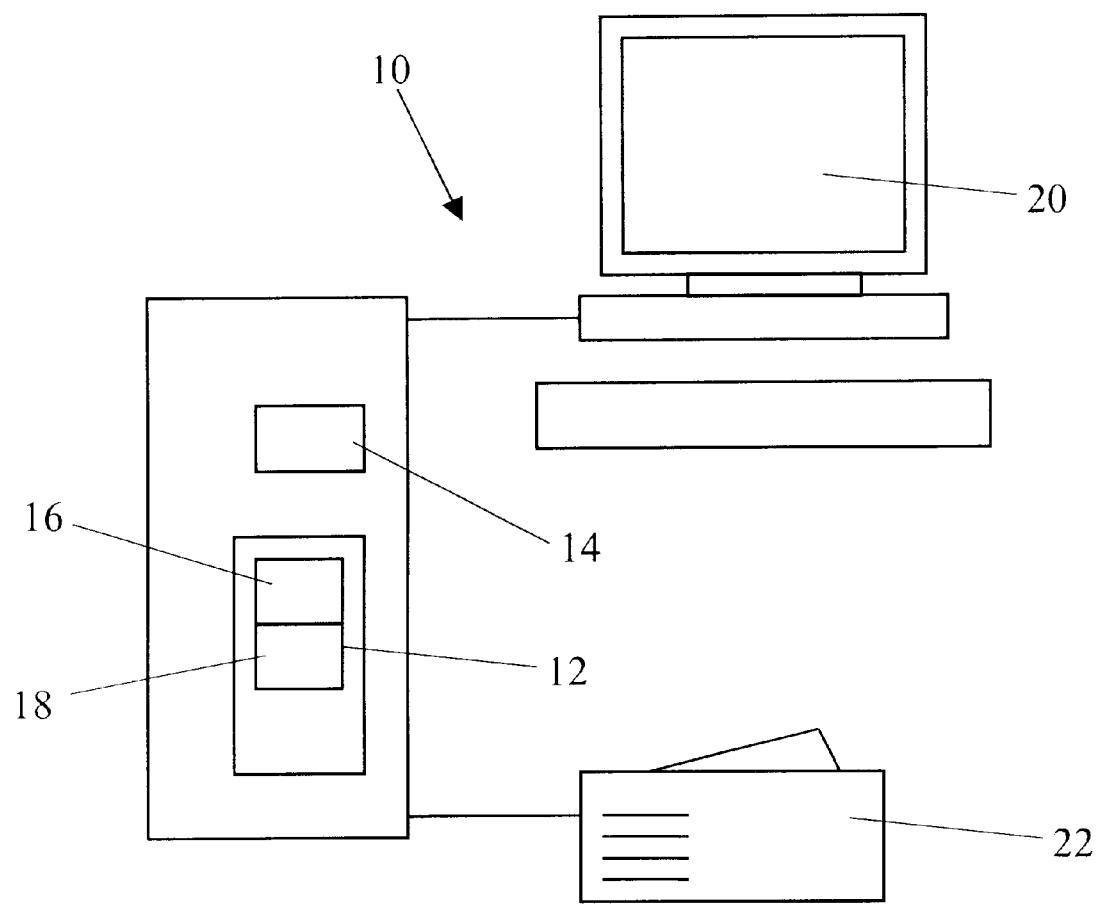
FIG. 1 shows a block diagram of a system according to the present invention to protect the proprietary information of a integral evaluation program and a separate acceleration program.
Figure 2:
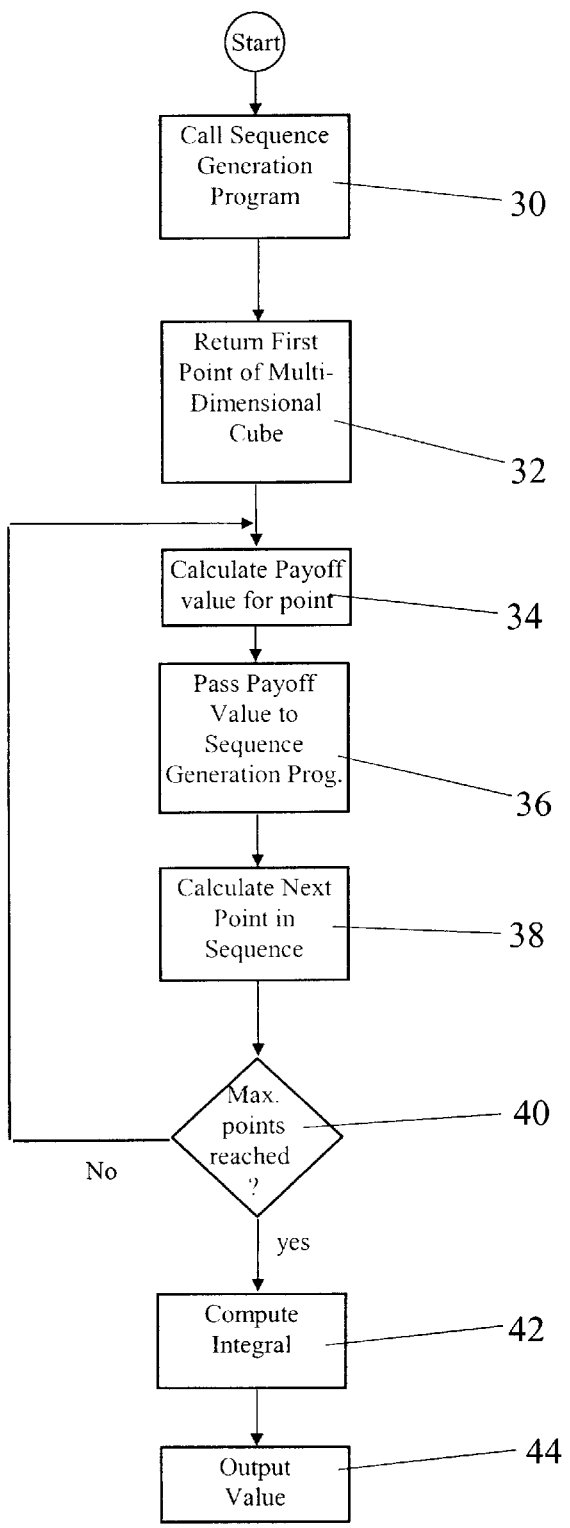
FIG. 2 is a flow diagram of the real-time operation of a modified valuation program according to the present invention.
Figure 3:
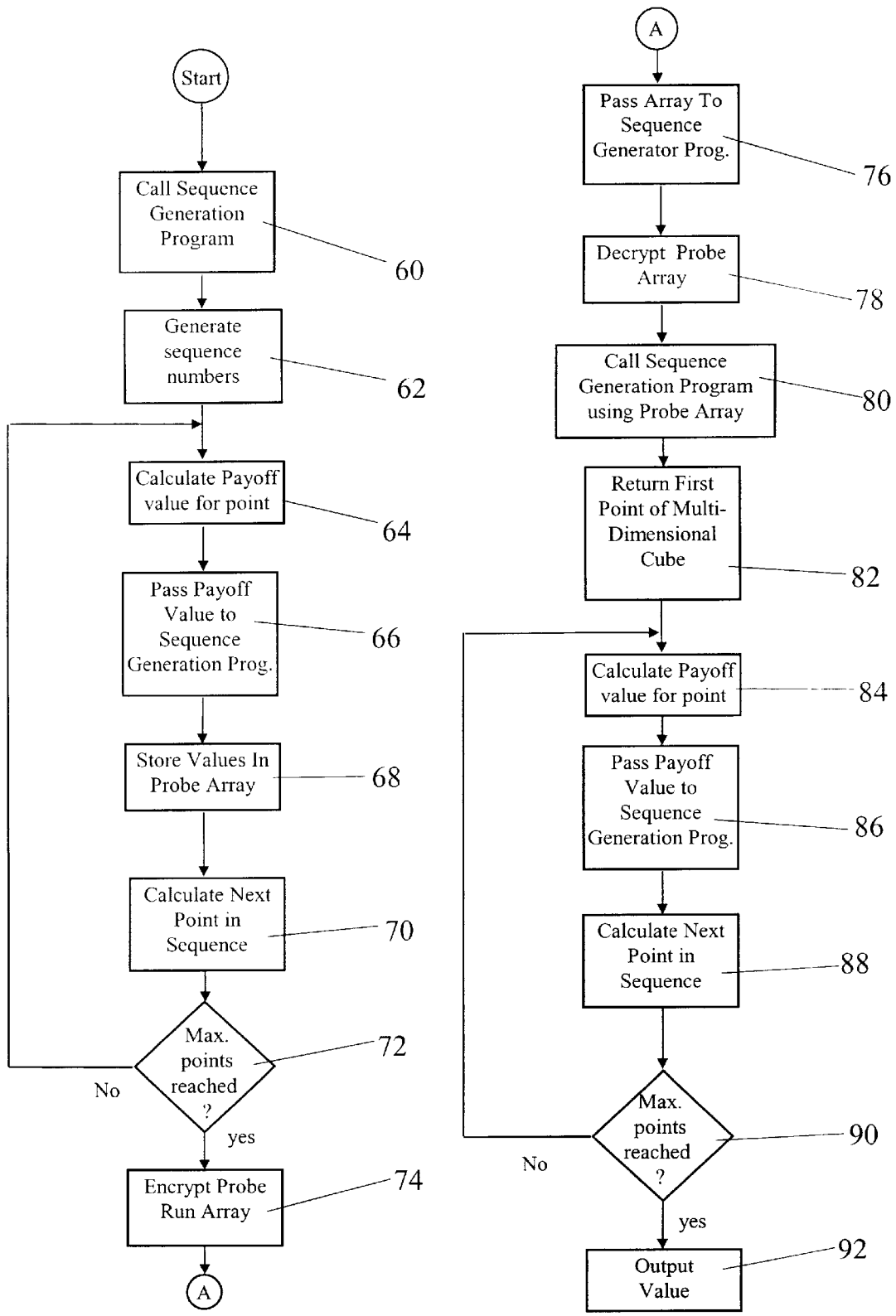
FIG. 3 is a flow diagram of the probe run operation of a modified valuation program according to the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

The present invention allows the acceleration of an integral evaluation program with solutions obtained by an acceleration program while protecting the secrecy of the acceleration program from the user of the evaluation program. The integral evaluation program may use the Monte Carlo method to evaluate the integral while the acceleration program may be a sequence generation program. The integral evaluation program interfaces with an executable version of a sequence generation without disclosure of proprietary information from either program. The sequence generation program may be in the form of a compiled object or subroutine library.

The present invention is embodied in a system for accelerating the evaluation of an integral with solutions obtained by an acceleration program, while protecting the secrecy of the acceleration program from the system user. The system is embodied in a computer configured to be used in the field of financial valuation. It is to be understood that the present invention may be used in any application requiring the evaluation of an integral using a solution such as a sequence of numbers generated by a sequence generation program. These applications can include simulation of thermal properties, simulation of polymers, three-dimensional image generation and finite element analysis, among others. An example of the computer for the preferred embodiment is an IBM type personal computer with a Pentium 200Hz microprocessor using a Windows NT operating system. Other general purpose computers configurable to create specific logic circuits such as a Sun SPARC-20 workstation with a SPARC processor using a UNIX operating system may be used for the computer.

The computer has a storage device which may be a hard drive or other large capacity memory. The computer has a processor coupled to the storage device which reads instructions of programs stored in the storage device. The programs configure the processor to create specific logic circuits to carry out the computations described below. An integral evaluation program such as a modified valuation program and an acceleration program such as a sequence generation program are stored in the storage device. Thus, the modified valuation program configures the processor to become an integral evaluation circuit and the sequence generation program configures the processor to become a sequence generation circuit. As will be explained, the modified valuation program is modified according to the present invention from a standard valuation program in order to create an interface protecting the secrecy of the sequence generation program.

The sequence generation program generates sequences of numbers or vectors for evaluation. The owner of the sequence generation program desires the sequences generated by the program to remain confidential and undiscernible by normal means by the valuation program user since the sequences may be used to deduce the sequence generation method. These sequence generation methods are developed using certain proprietary assumptions of a valuation program which solves an integral or problem such as modified valuation program. Each call to the sequence generation program returns a sequence of points in a unit cube of the dimensionality of the integral or problem solved by the modified valuation program. The dimensionality is usually known at the outset of the calculation, and in practice would be determined by the details of the security, such as the type of the security; the time horizon, such as the intervals of interest payments and maturity of the security; and the number of stochastic factors, such as models for long term and short term interest rates.

In the present embodiment, the modified valuation program is a valuation program for a financial instrument whose integrand incorporates stochastic models and time variables. The financial instrument may be a portfolio of stocks, bonds, options and commodities, derivatives such as interest rate derivatives or mortgage backed securities etc. The modified valuation program is also proprietary in that the specific method by which the calculation is performed and the resulting information and assumptions are secret and undiscernible to a user by normal means. For example a proprietary pricing integrand may be a common model for pricing call or put options on foreign exchange rates. These options can be priced by assuming that the foreign exchange rate is a log-normally distributed random variable, but that the standard deviation is a predetermined function of time. This function is proprietary. In some cases, a user may not even wish to disclose that they are using this model; thus, the model itself may be proprietary as well as the parameters that go into the model.

The resulting values which are produced by the modified valuation program depend upon the nature of the security being evaluated and any proprietary models that go into the precise specification of the security, such as interest rate models, prepayment models, volatility term structure etc. The modified valuation program takes as its input a point in the multi-dimensional unit cube from the sequence generated by sequence generation program and evaluates the integral at that point. Other sample points in the sequence are generated according to the present invention to produce values which are averaged to solve the integral as will be explained below. The point and the sample points are a sequence of multi-dimensional vectors in a unit cube. The dimension of the multi-dimensional unit cube are dependant on the integrand of the modified valuation program. The valuation program on which the modified valuation program is based has coding which makes a call to a sequence generated by a sequence generation program. The integral is then evaluated at each point in the sequence.

A user who desires to obtain a valuation of a particular security runs the modified valuation program. The modified valuation program configures the processor to become a circuit which uses sequences of numbers generated by the sequence generation program to produce a value for the particular security being evaluated. The resulting value or values may be displayed to the user on a display device or be stored in storage device and printed on a printer. The present invention allows the user of the valuation program to use the sequence generation program in conjunction with the modified valuation program without learning the specific operations of the sequence generation program as will be explained below.

The owner of the valuation program makes modifications to the original valuation code of the valuation program at the place in the code where a pseudo-random number is called from a sequence and the integrand evaluated. The modification configures the processor to generate a solution from the acceleration program such as sequence generation program. The processor then samples the integral by using the solution to solve the integrand to obtain information relating to the integral. In this embodiment, the processor calls the next number in the proprietary sequence, evaluates the integrand at this point and feeds back the integrand value to the proprietary sequence generation program. The process of feedback enables the sequence generation program to sample the integrand of the valuation program. The processor then determines further solutions by using the information relating to the integral obtained by sampling the integrand. As a result of the feedback process, the sequence generation program uses the representation of the integrand to determine the remaining sample points. The processor then calculates a value for the integral based on the determined further solutions without disclosing the determined further solutions to the user of the evaluation program.

The real-time operation of the modified valuation program according to the present invention. Will not be described when a user initiates the modified valuation program to obtain a value for a particular financial instrument, a call is made to run the sequence generation program in step 30. The sequence generation program then determines a point in a sequence. The sequence generation program returns the point in an appropriate dimensional unit cube for the valuation integrand of the modified valuation program in step 32.

A call to run the modified valuation program which is designed to calculate the payoff is then made in step 34. The modified valuation program takes as its input the point in a unit cube from the sequence generation program in step 32. The modified valuation program then evaluates the integrand at the point to produce an integrand value at the point in the sequence.

The modified valuation program passes this value back to the sequence generation program in step 36. Although the sequence generation program has available to it the value of integrand of the proprietary valuation program at the point in the unit cube that it has selected in step 32, this information is only used by the sequence generation program to generate future points for a sequence in step 38. Thus, the sequence generation program determines a sequence of sample points by using the integrand value to obtain information about the integrand without revealing the integrand.

The sequence generated by the sequence generation program resides in the storage device of the computer. Thus, the sequence is not readily accessible to the user performing the valuation of the security in question. When the sequence generation program has generated a sequence with enough points such that the estimate for the integral is sufficiently accurate, the resulting sequence is used to evaluate the integrand in step 42. This may be simplified by specifying a fixed number of points which will be used in the evaluation. Such an implementation is shown in step 40 which checks whether a fixed number of evaluation points has been reached. The number of evaluation points which is necessary for a sufficiently accurate estimate may be determined by prior experimentation.

After the evaluation of the points is completed in steps 34 to 38, the sequence generation program uses the values of the integrand at the sequence points to obtain a resulting integral solution based on the evaluation of the integrand from the sequence of sample points in step 42. The resulting value is output in step 44 to an output device. The output device may be the display screen or the printer. Alternately, the output may be sent to another computer for storage or further analysis.

Step 42 implements the following calculation to obtain an integral solution:

$$\text{integral} = \sum_{i=1}^{N} w_i f(x_i)$$

where the index i runs from 1 to N and labels the points in the sequence; $x_1$ are the proprietary sequence points in the D-dimensional hypercube, f is the integrand; and $w_1$ are weighted factors. In one embodiment of the invention the weighted factors all have the same value, namely 1/N. Thus, the resulting integral solution is obtained by averaging the value of the integrand at all the points in the sequence.

However, it may be desirable for the party providing the proprietary sequence generation program to allow the weighted factors to vary with i in a proprietary manner in order to improve the estimate of the integral given by step 42. Obtaining the integral solution by this method involves calculating a weighting factor for the value of the integrand at all the points in the sequence. Each value of the integrand is then multiplied by its respective weighting factor to obtain a weighted value. The resulting integral solution is obtained by adding the weighted values.

This method has the additional advantage that even if the user of the modified valuation program reads the proprietary sequence points $x_i$, the user is still not able to obtain an accurate value for the desired integral. In this way, the party providing the sequence generation program enjoys a further level of protection for their proprietary software.

A public domain example of where the use of non-uniform weighted factors improves accuracy and therefore increases the speed of calculating an integral to a desired target accuracy is provided by Simpson's Rule in one dimension, which is known to those reasonably skilled in the art. In Simpson's Rule, described by P. J. Davis and P. Rabinowitz, "Methods of Numerical Integration," pp. 51–60 (Academic, San Diego, 1984), the integral $$\int_{x_1}^{x_1+2h} f(x)dx$$

is approximated by the non-uniform weighted factor formula $$\int_{x_1}^{x_1+2h} f(x)dx \cong h/3\,[f(x_1) + 4f(x_1+h) + f(x_1+2h)]$$

in which the integrand at the point $x_1+h$ is given greater weight than the value of the integrand at $x=x_1$ and $x=x_1+2h$. Of course, other weighting methods may be used in the sequence generation program.

Implementation of the present invention allows the significant acceleration of integral evaluation programs such as a valuation program by adaptive sequence generation programs such as sequence generation program without compromising the security of either valuation or sequence generation programs. The invention allows a user to accelerate the evaluation program without compromising the security of either it or the sequence generation program.

An example demonstrating use of the embodiment operating in a real-time mode to produce a value from the integrand will now be explained. In a particular valuation program such as modified valuation program, an adaptive sequence generation program may take advantage of various parameters in the valuation program. In this example, the adaptive sequence generation program takes advantage of the fact that the main contribution to the integral comes from a particular bounded region of a D-dimensional hypercube. This is the case if the integrand is negligibly small (e.g. less than 0.0001), in most of the hypercube except for a region near the origin, and the integrand is always a positive quantity. These parameters are assumed or deduced by the author of the sequence generation program but are not known by the user of the valuation program.

The integral is evaluated using a limit of 10,000 points. Obviously a greater number of points may be used if speed is to be sacrificed for accuracy. The 10,000 points are determined experimentally as optimal to produce an executable accurate result to estimate the integral in question in an acceptable amount of time.

The adaptive sequence generation program is then employed to generate a sequence for the integral in modified valuation program. The adaptive sequence generation program functions by the following proprietary method which are incorporated in steps 32–38:(i) generate 1000 random points within the hypercube; (ii) working from the edges of the hypercube towards the center of the hypercube, test to see for which points the integrand first exceeds the value 0.0001; (iii) construct the polygon joining these points; (iv) generate the next 9,000 points within the polygon, and use these 9,000 points to estimate the integrand. This process generates a more accurate result than if the 10,000 points were deployed at random throughout the hypercube, because no points are being wasted on the region where the integrand is negligibly small. The accuracy achieved by the adaptive sequence generation program could also be achieved using a random sequence of 1,000,000 points. Thus, the sequence generation program accelerates the calculation of the integral of the modified valuation program because a smaller sequence may be used to generate as accurate a result as a larger non-adaptive or random sequence.

This hypothetical example of a proprietary adaptive method for sequence generation program is given for illustration only. The present invention is applicable to any sequence generation program. For example, non-adaptive sequences which use the Sobol sequence or a proprietary sequence such as that developed by IBM, or adaptive sequences which use an algorithm such as the above, or a proprietary sequence generator, such as that invented by NumeriX LLC may be used. These and other sequence generation programs may take advantage of various attributes of valuation programs.

Although the sequence generation program learns about the integrand of the modified valuation program at the machine level, the information about the integrand is never made available to the party providing the proprietary sequence generation program. Additionally, the sequence generation program is provided to the user only as an executable code which is loaded into computer. Thus, its proprietary source code and algorithms are not disclosed to the valuation program user.

The preferred embodiment of the invention in the modified valuation program is given below in two segments of C++ code. The first code segment is representative of all programs which use the Monte Carlo method to generate a solution to an integrand. This code segment calls for a sequence to be generated by a sequence generation program such as the C++ pseudo-random number generator rando or another object which generates sequences, and is found in all such evaluation programs. The segment represents the basic valuation program on which modified valuation program is written.

```
int num, total = 10000;
double sum = 0;
for (num=0; num < total; num++) {
        double value = evaluate( );
        sum += value;
}
cout << "Average: " sum/total;
```

In this segment of the unmodified valuation program the number of samples is called "total" and has been set to 10,000. The dimension D of the integral has also been specified earlier in the valuation program. The function "evaluate" calls a sequence generation program which provides a D-dimensional vector of random numbers, each generated by a call to a number generator such as the rand () function of ANSI draft compliant C++. of course any suitable sequence generation program or object may be employed to generate the sequence. These may range from a simple pseudo-random number generator which generates random numbers such as the aforementioned rand () function of the C++ standard programming library to non-adaptive or adaptive deterministic sequence generation programs or objects.

The function "evaluate" takes each random point generated by the sequence generation program and returns the value of the security at the random point provided. The function "evaluate" contains secret information such as the models of the security, the stochastic processes, security types, etc. Such secret information limits the effectiveness of a sequence generation program which is not modified to use the special attributes of the function. In order to use a more complex sequence generation program to accelerate the "evaluate" function, the details of the function "evaluate" would have to be known to modify the sequence generation program to take advantage of the specific integrand calculations in this unmodified code segment.

The "for loop" performs this step "total" (10,000) times, adding the value to the sum of values from the previous step. It is to be understood that in a typical financial or scientific calculation, this calculation may be performed for sequences of different number of points in the multi-dimensional unit cube depending on the desired accuracy. Finally, the "average" is computed by dividing the sum by the number of points. In some applications, the user may wish to calculate the value-at-risk instead of the value of the integral. This value represents the computed integrand value and the result is written to an output device such as the display screen or printer.

However, in this example, the user of the security valuation program would not use a proprietary adaptive sequence generation program such as sequence generation program to accelerate the valuation process without jeopardizing the secrecy of either the valuation program or the sequence generation program. For example, the user could purchase a generated sequence from a party owning sequence generation program which could be used by "evaluate" instead of the random sequence. However, this sequence would give the user of the valuation program information on the proprietary methods underlying the sequence generation program. Alternatively, the user could contract with a party to develop a specifically tailored adaptive sequence generation program. However, this jeopardizes the secrecy of the valuation program.

The present invention provides an interface to protect the propriety of both programs. A user would modify the above code segment of the unmodified valuation program to produce the modified valuation program according to the present invention as follows. In the example segment below, functions preceded by the string "nx" are proprietary functions provided by the party that is providing the sequence generation program 18, and it is assumed that the value of the variable "dim" which represents the dimension of the integral value has been assigned earlier.

```
nxSequence seq(10,000, dim);
double vec [dim];
int num = 0;
while (nxIsValid(seq)) {
    nxGetVector (vec);
    double val = evaluate(vec);
    nxCaptureValue (seq, val);
    }
cout << "Average: " nxGetAverage(seq) << endl;
```

In this example, the function "nxsequence" initializes the sequence generation program. The sequence generation program generates a sequence "seq" which has 10,000 points in "dim" dimensions. A "dim" dimensional vector "vec" is defined to be double precision, and represents the point in the "dim" dimensional hypercube; its value is assigned by the call to the function "nxGetVector" as in step 32. Of course a sequence of greater or lesser than 10,000 points may be made in different dimensions depending on the desired accuracy and the nature of the integral to be evaluated.

The integrand at the point assigned by "nxGetVector" is calculated by the call to the proprietary valuation function "evaluate" and the result is assigned to the double precision variable "val" as in step 34. The call to the function "nxCaptureVal" stores the value "val" associated with the current point in the sequence "seq" in an internal memory register established in the storage device by the sequence generation program.

The average value of the integrand at the points in the sequence is computed in step 42 using the function "nxGetAverage," and output as in step 44. This string is then written out on the printer or displayed on a computer screen such as display. If a user desires to compute the value-at-risk, an additional line of code could be added:

cout <<"value-at-risk:"<<nxGetVar (seq, 0.95) <<endl In this case, step 42 would also compute the value-at-risk for the sequence "seq" at the 95% confidence level. This value would also be output by being printed by the printer or displayed by the display screen. The value-at-risk is calculated by taking the integrand values created from the sequence and creating a histogram. The histogram distribution is integrated which allows determination of the value over which a given percentage (such as 5% in the case of 95% confidence level) of the integrand values exceed. This value is then output as the value-at-risk.

By the modification, the party owning the sequence generation program does not examine the modified valuation program and its underlying properties such as "evaluate." The user of the modified valuation program does not have access to the sequence generated by the sequence generation program.

Sometimes the evaluation program has to be run many times for the same or similar evaluation equation. This may be the case in a value-at-risk calculation on a portfolio containing many similar instruments, or the same or similar security may be being priced many times throughout a trading day for different customers. When this is case, the effectiveness of the sequence generation program may be enhanced by initiating a probe run prior to the real-time evaluation of the integrand. The probe run mode of the present invention will now be explained. A probe run is initiated by calling the sequence generation program in step 60. The sequence generation program generates a sequence having a relatively large number of points (e.g. 20,000–100,000) in step 62. The probe run is performed on the security of interest by using the valuation program in step 64 before any attempt is made to actually value the security.

The payoff value is passed to the sequence generation program in step 66. The values are also stored in a probe array in step 68 which will be used by the modified valuation program when actually calculating the value of the security. In step 70, the sequence generation program calculates the next point in the sequence based on the information gained from the value returned from the payoff value in step 64. A check is made in step 72 to determine if the number of points in the probe run has been finished.

The purpose of the probe run is to acquire data about the security from the modified valuation program which can be stored by the sequence generation program in an encrypted string which will be used later by the modified valuation program. The precise characteristics about the integrand of the valuation program that are desirable to precompute will depend upon the details of the proprietary sequence generation program. The probe run generally uses considerably more sample points than would be used to value the security; however, since the probe run is being performed off-line (i.e. not in real-time), the relative slowness of this step is not a disadvantage for the party who wishes to value the proprietary security.

During the probe run the result of the calculation of the value of the security is not output. Instead, details of the security as determined by the sequence generation program are stored in an probe array string which is encoded in step 74. In the preferred embodiment, the encoding is performed using a public/private key encryption algorithm. The probe array is thus encrypted with a public key. The encrypted probe array is stored in storage device 12. The encrypted probe array may be output if desired.

Subsequently when the security is evaluated, the encrypted string is passed back to the modified valuation program in step 76. The information gleaned from the probe run, in the form of the array string, is decoded in step 78. In this example, a private key would be required to decrypt the encrypted probe array. The probe information is made available to the sequence generation program in step 80 so that it may provide the most appropriate sequence as quickly as possible.

The information from the probe run in the decrypted string allows the sequence generation program to generate a targeted and efficient sequence. The sequence generation program then returns a point in an appropriate dimensional unit cube for the valuation integrand of the modified valuation program using the information from the probe run in step 82.

A call to run the modified valuation program is then made in step 84. The modified valuation program takes as its input the point in a unit cube from the sequence generation program in step 82. The modified valuation program then calculates a value for the integrand at the point in the sequence and passes this value back to the sequence generation program in step 86. This information is used by the sequence generation program to generate future points for a sequence in step 88.

Thus, as before, the sequence generated by the sequence generation program resides in the storage device of the computer of the user performing the valuation of the security in question and is not readily accessible to the user. Step 90 checks to determine if enough points in the sequence have been determined for sufficient accuracy. When the number of points have been reached, the resulting sequence is used to evaluate the integrand in step 92. As in the above real-time example, the resulting values may be averaged or be assigned weighting factors to calculate the value. The resulting value is output and may be displayed on display or printed out on printer. The value-at-risk may also be determined as explained above.

The probe run provides a more accurate result than the real time example. This is illustrated in a valuation example which makes the same previous assumption that the integrand is negligibly small outside a certain region around the origin of the hypercube. A user will estimate the integral using 10,000 sample points, but using the probe will precompute the boundaries of the region where the integrand is greater than 0.0001. A probe run of 50,000 points is executed in this example. Of course larger or smaller numbers of points may be used to obtain the probe run boundaries depending on the degree of accuracy and the amount of time which a user wishes to allocate to this function. The boundaries of the region are determined very accurately with the larger number of points relative to the boundary which could be obtained with the 1000 points used in the real time mode.

The probe information on the boundary is stored and encrypted as in steps 68 and 74. In the preferred embodiment, the vertices of the polygon are encoded using the public key of an public/private key encryption program such as the public-domain encryption program Pretty Good Privacy or RSA's Viacrypt commercial encryption program. However, any secure encryption method or program may be used. This encryption results in a string of ASCII characters, which can only be decoded by the party who authored the adaptive sequence generation program which holds the matching private key, thus preserving the secrecy of the adaptive sequence generator.

The encrypted string protects such information which may reveal the proprietary assumptions and methods of the sequence generation program unlike an unencrypted string. Since its contents are protected, the encrypted character string may be freely displayed to other parties, such as those using the valuation program. Obviously, to these parties, the string is meaningless and conveys no information about how the sequence generator works, or what information about the integrand has been encoded in the string.

The integral is evaluated by the following steps: (i) the sequence generation program decrypts the ASCII string and determines the boundaries of the polygon in which the integrand is non-negligible; (ii) the integral is evaluated using 10,000 points placed only within the polygon by the sequence generation program. The result for the integral will be more accurate than that obtained in the real-time mode described above, because (i) the boundary of the polygon has been determined more accurately, using 50,000 points, not 1000; and (ii) 10,000 points are used to estimate the integral rather than 9000 points. Thus, a sequence with fewer points may be used in the probe run mode to obtain the same accuracy as a larger sequence in the real-time mode.

The probe run can be a useful technique under the following circumstances: (i) if it is desired to integrate a variety of integrands, all of which have the property of being negligibly small outside the same region; and (ii) the integrals must be performed as quickly and accurately as possible. These circumstances are often met in financial applications; for example, a derivatives dealer may wish to perform a probe run on the more complex and demanding securities in his portfolio at the beginning of the day using that day's prices, yield curve and so on: then calculations can be performed quickly as long as market conditions do not change too rapidly.

The code segments for a modified valuation program which uses the results of a probe run is as follows. First, a user would add the following code segment for initiating a probe run in the modified valuation program.

```
int dim = 360;
nxSequenceProbe seq(10000,dim);
double vec [dim];
while( nxIsValid(seq) ) }
    nxGetVector (vec);
    double val=evaluate (vec);
    nxCaptureValue (seq,val);
}
cout << "Hint: " << nxGetHint(seq) << endl;
```

In this example, the dimension "dim" is defined to be 360. The dimension of the problem depends on time variables, the type of security modeled by the integrand and the number of stochastic models. Of course integrals of greater or less dimensions may be evaluated using the probe run by setting the "dim" variable to the proper dimension.

A probe sequence is initiated by the "nxSequenceProbe" call that will be used to produce a sequence of 50,000 points as in step 62. Of course the actual length of the probe run itself can be much longer than this, however, the user will not be able to ascertain the number of points in the probe run.

As in the previous code example, "nxSequence" is assumed to be the sequence generation program which may be proprietary. The sequence generation program is initialized to produce a probe sequence which will eventually generate a "seq" of 10,000 points in "dim" (360) dimensions. The initialization thus defines the parameters of the sequence to be generated. The length of the probe run itself is not needed by the user of the evaluation problem and is determined by the party providing the sequence generation program. Sequences of any length for the probe run may be generated if desired. The command double vec[dim] declares a double precision vector of dimension "dim" which represents the output of the sequence generation program. The output is a multi-dimensional vector point in the multi-dimensional cube.

A while loop is then set up between steps 64 and 72. The variable "nxIsValid" returns "false" once 50,000 points have been evaluated and the loop terminates in step 72. The command "nxGetVector" returns the value of the point in "dim" dimensions as in step 64. The "nxGetVector" command calls the sequence generation program to supply the next point in the sequence which is returned as "vec" as in step 70. The integrand is then evaluated at the point given by "vec." The "evaluate" function is provided by the user in the form of the proprietary integrand in the modified valuation program, which is unknown to the provider of the sequence generation program. The value of the integrand at the point "vec" is stored by the "nxCaptureValue" command in an internal array established by the sequence generation program as in step.

After 50,000 points are evaluated, the data in the array are analyzed by "nxGetHint" which outputs the "hint" value for the sequence "seq" to an output device. The "hint" value is then encrypted as in step 74 and the resulting ASCII string may be written out on a printer or displayed on a computer screen.

Subsequently, for use in valuation mode, the valuation program is modified at the point where it makes a call to the sequence generation program as follows.

```
char* hint = "ABCD1234";
int dim = 360;
nxSequence seq(10000,dim,hint);
double vec [dim];
    while( nxIsValid(seq) ) {
        nxGetVector (vec);
        double val=evaluate (vec);
        nxCaptureValue (seq,val);
    }
}
cout << "Average " << nxGetAverage(seq) << endl;
cout << "VAR: " nxGetVaR(seq, 0.95) << endl;
```

In this code segment, the character string for "hint" represents the encrypted results of the probe run which are passed to the sequence generation program in step 76. The dimension "dim" is set to 360 as defined in the probe run segment above. As in the previous code examples, "nxSequence" is assumed to be the sequence generation program which may be proprietary. The sequence generation program is initialized to produce a sequence "seq" of 10,000 points in "dim" (360) dimensions using the "hint." The initialization step thus defines the parameters of the sequence to be generated and specified points within the scope of the information gained in the probe run. Sequences of greater than or lesser than 10,000 points may be generated if desired. The command "double vec[dim]" declares a double precision vector of dimension "dim" which represents the output of the sequence generation program.

A while loop is then set up, the variable "nxIsvalid" returns "false" once 10,000 points have been evaluated and the loop terminates. The command "nxGetVector" returns the value of the point in "dim" dimensions. The "nxGetVector" command calls the sequence generation program to supply the next point in the sequence which is returned as "vec." The integrand is then evaluated at the point given by "vec." The value of the integrand at the point "vec" is stored by the "nxCaptureValue" command in an internal array established by the sequence generation program.

After 10,000 points are evaluated, the average value of the integrand evaluated over the points generated by the sequence generator "seq" is computed by "nxGetAverage" as in step 92. This result is output and constitutes the Monte Carlo estimate for the desired integral. The "nxGetVaR" function allows the value-at-risk of the integrand to be computed at the 95% confidence level and output to an output device if the user desires. evaluation program. In such a method, a sequence of points is generated by the sequence generation program. A simulated value is calculated using the integral evaluation program based on a number of points in the sequence. The number of points used in calculating the simulated value are calculated by the sequence generation program. The dimension of the integral evaluation program may be determined based on the number of points in the sequence used in the calculation of the simulated value. Subsequent sequences of sample points are determined by incorporating the dimension of the integral evaluation program and the simulated value without revealing the integral evaluation program. Subsequent values are calculated using the subsequent sequences. A resulting solution is then obtained based on the values. The value may be obtained by averaging the values or by the weighting method explained above.

The generation of the sequences for the simulations may be accelerated by a probe run similar to the above examples. Such a probe run would involve first generating a probe sequence of points by the sequence generation program. A simulated probe value is calculated using the valuation program based on a number of points in the sequence, The number of points used in calculating the simulated probe value is used to determine the dimensionality of the valuation program. Subsequent sequences of sample points are determined by incorporating the dimensionality of the valuation program and the simulated value without revealing the valuation program. Subsequent probe values are calculated using the subsequent sequences. The probe values are stored in a probe array and information contained in the probe array is incorporated in the real time run of the sequence generation program.

The unmodified valuation program would in this case contain a code segment as follows:

```
int num, total = 10000;
double sum = 0;
for (num=0; num < total; num++) }
    double value = evaluate( );
    sum += value;
}
cout << "Average: " << sum/total;
```

In this segment, the number of scenarios is called "total" and has been set to 10,000. The function "evaluate" calculates the value of the desired quantity, such as the value of a certain derivative security at the end of a specified time period, for the current scenario. "Evaluate" may contain many calls to a pseudo-random number generator "Normal ()", and is a proprietary function known only to the user of the valuation program. The pseudo-random number generator "Normal()" might, for example, generate normally distributed random numbers with mean 0 and variance 1. The function "evaluate" contains secret information such as the models of the security, the stochastic processes, security types etc.

The "for loop" performs the step "total" (10,000) times of assigning the result of evaluate to the double precision variable "value", adding the result to the sum of values from the previous step. Finally the desired average is computed by dividing the sum by the number of scenarios.

In order to determine the dimension of the multi-dimensional integral, the above code segment would be modified as follows:

```
char* hint = "ABCD1234";
nxSequence seq(1000,hint);
while( nxIsValid(seq) ) {
    nxBeginSample (seq);
    double val=evaluate( );
    nxCaptureValue(seq,val);
    nxEndSample (seq);
}
cout << "Average: " << nxGetAverage(seq) << endl;
```

This example differs from the previous examples, as it includes calls to the functions "nxBeginSample(seq)" and "nxEndSample(seq)." All calls to the random number generators made in the valuation program between "nxBeginSample" and "nxEndSample" belong to the same scenario that is averaged using the sequence "seq." The proprietary sequence generation program contains an internal counter which counts the number of calls to the random number generators made in "evaluate()." Hence the proprietary sequence generation program can determine the dimension of the integral, even though this might not be known to the user of the valuation program. Wherever a call is made to the random number generator "Normal()" in "evaluate", which generates normally distributed random numbers with mean 0 and variance 1, the user replaces each occurrence of the user's function "Normal()" by the proprietary sequence generator "nxNormal()". In this example, the functioning of the probe run and the "hint" is as has been given previously. As in the above examples, a Value-at-Risk calculation may be performed by replacing the last line with cout <<"VAR: " <<nxGetVaR(seq,0.95)<<endl;

It will be apparent to those skilled in the art that various modifications and variations can be made in the method and system of the present invention without departing from the spirit or scope of the invention. For example, when the integral evaluation program is based upon the lattice or tree method, instead of the Monte Carlo method, the present invention also allows an integral evaluation program such as a derivatives security valuation program to interface with an executable version of a lattice acceleration program, without disclosure of proprietary information of either program. The lattice acceleration program may be in the form of a compiled object or subroutine library.

Thus, it is intended that the present invention cover modifications and variations that come within the scope of the spirit of the invention and the claims that follow.

What is claimed is:

1. A method of accelerating an integral evaluation program with solutions obtained by an acceleration program having at least one proprietary algorithm for obtaining the solutions, while protecting the secrecy of the proprietary algorithm of the acceleration program from a user of the evaluation program, the method comprising the steps of:

generating a solution using the proprietary algorithm from the acceleration program while protecting the secrecy of the proprietary algorithm from the user;

sampling the integral by using the solution to solve the integral to obtain information relating to the integral;

determining further solutions by using the information relating to the integral obtained by sampling the integral; and calculating a value for the integral based on the determined further solutions without disclosing the determined further solutions to the user of the evaluation program.

2. The method of claim 1 wherein the solutions are points in a sequence; and wherein the evaluation program uses the Monte Carlo method to solve the integral.

3. The method of claim 2 wherein the evaluation program is a valuation program for a financial instrument, wherein the integrand incorporates stochastic models and time variables.

4. The method of claim 1 wherein the evaluation program uses the lattice method to solve the integral and wherein the acceleration program is a lattice acceleration program.

5. A system for accelerating the evaluation of an integral with solutions obtained by an acceleration program, while protecting the secrecy of the solution generation program from the system user, the system comprising:

a storage device having the acceleration program and a program for evaluating the integral;

a processor coupled to the storage device, the processor being configured to:

generate a solution from the acceleration program;

sample the integral by using the solution to solve the integral to obtain information relating to the integral;

determine further solutions by using the information relating to the integral obtained by sampling the integral; and calculate a value for the integral based on the determined further solutions without disclosing the determined further solutions to the user of the evaluation program.

6. The system of claim 5 wherein the solutions are points in a sequence; and wherein the evaluation program uses the Monte Carlo method to solve the integral.

7. The system of claim 6 wherein the evaluation program is a valuation program for a financial instrument, wherein the integrand incorporates stochastic models and time variables.

8. The system of claim 5 wherein the evaluation program uses the lattice method to solve the integral and wherein the acceleration program is a lattice acceleration program.

9. The system of claim 5 further comprising an output device coupled to the processor, wherein the calculated value is transmitted to the output device.

10. A method of accelerating an integral evaluation program having an integrand using the Monte Carlo method with a sequence generated by a sequence generation program having a proprietary sequence generation algorithm, while protecting the secrecy of the integrand of the integral evaluation program and the sequence generation program from a user of the evaluation program, the method comprising the steps of:

determining a point in a sequence generated by the sequence generation program;

evaluating the integrand at the point to produce an integrand value;

determining a sequence of sample points by using the integrand value to obtain information about the integrand without revealing the integrand to the user of the evaluation program;

evaluating the integrand using the sequence of sample points to produce corresponding integrand values without revealing the sequence of sample points or the sequence generation algorithm to the user of the evaluation program; and obtaining a resulting integral solution based on the evaluation of the integrand using the sequence of sample points.

11. The method of claim 10 wherein the integral evaluation program is a valuation program for a financial instrument, wherein the integrand incorporates stochastic models and time variables and the resulting integral solution is a value of the financial instrument.

12. The method of claim 10 wherein the sequence generation program is an adaptive sequence program.

13. The method of claim 10 wherein the point and the sample points are a sequence of multi-dimensional vectors in a unit cube, the dimensions of the multi-dimensional unit cube being dependant on the integrand.

14. The method of claim 10 wherein the step of obtaining a resulting integral solution includes averaging the integrand values from the points in the sequence.

15. The method of claim 10 wherein the step of obtaining a resulting solution further comprises the steps of:

calculating a weighting factor for each integrand value from all the points in the sequence;

multiplying each integrand value by its respective weighting factor to obtain a weighted value; and wherein the resulting integral solution is obtained by adding the weighted values.

16. The method of claim 15 wherein the step of calculating a weighting factor is performed by using Simpson's Rule in one dimension.

17. The method of claim 15 wherein the step of obtaining a resulting solution is performed by the sequence generation program without revealing the calculating and multiplying steps to the user of the integral evaluation program.

18. The method of claim 11 wherein the step of obtaining a resulting integral solution further comprises the steps of:

creating a histogram distribution of the integrand values;

integrating the histogram distribution; and determining a value-at-risk point by calculating the integral value below which a preselected percentage of the integral values fall.

19. The method of claim 10 further comprising the step of specifying the number of points in the sequence.

20. A method of accelerating an integral evaluation program having a proprietary integral evaluation algorithm, using the Monte Carlo method with sequences generated by a sequence generation program having a proprietary sequence generation algorithm, while protecting the secrecy of the proprietary sequence generation algorithm of the sequence generation program from a user of the integral evaluation program, the method comprising the steps of:

generating a sequence of points by the sequence generation program using the proprietary sequence generation algorithm;

calculating a simulated value using the integral evaluation program based on a number of points in the sequence;

counting the number of points used in calculating the simulated value;

determining the dimensionality of the integral evaluation program based on the number of points used in the calculation of the simulated value, wherein the dimensionality of the integral is kept secret;

determining subsequent sequences of sample points by incorporating the dimensionality of the integral evaluation program and the simulated value without revealing the algorithm of the integral evaluation program;

calculating subsequent values using the subsequent sequences without disclosing the proprietary sequence algorithm to the user of the integral evaluation program; and obtaining a resulting solution based on the values.

21. The method of claim 20 wherein the integral evaluation program is a valuation program for a financial instrument, wherein the integrand incorporates stochastic models and time variables and the resulting integral solution is a value of the financial instrument.

22. The method of claim 20 wherein the resulting solution is the averaged value of the subsequent values.

23. The method of claim 20 wherein the step of obtaining a resulting solution further comprises the steps of:

calculating a weighting factor for each value;

multiplying each value by its respective weighting factor to obtain a weighted value; and wherein the resulting solution is obtained by adding the weighted values.

24. The method of claim 20 further comprising the steps of:

generating a probe sequence of points by the sequence generation program;

calculating a simulated probe value using the integral evaluation program based on a number of points in the sequence;

counting the number of points used in calculating the simulated probe value;

determining the dimensionality of the integral evaluation program based on the number of points used in the calculation of the simulated probe value;

determining subsequent sequences of sample points by incorporating the dimensionality of the integral evaluation program and the simulated value without revealing the integral evaluation program;

calculating subsequent probe values using the subsequent sequences;

storing the probe values in a probe array; and wherein the step of determining subsequent sequences of sample points incorporates the information contained in the probe array.

25. A method of accelerating an integral evaluation program having an integral using the Monte Carlo method with a sequence generated by a sequence generation program having a sequence generation algorithm, while protecting the secrecy of the sequence generation algorithm from a user of the evaluation program, the method comprising the steps of:

determining a point in a probe sequence;

evaluating the integrand using the point in the probe sequence to produce an integrand value without revealing the integrand;

determining further sample points using the integrand value to obtain information about the integrand;

storing the further sample points in a probe array;

generating a sequence determined by the sequence generation program as a function of the probe array without revealing the sequence algorithm to the user of the evaluation program;

determining a point in a sequence generated by the sequence generation program;

evaluating the integrand at the point to produce an integrand value;

determining a sequence of sample points by using the integrand value and probe array to obtain information about the integrand without revealing the integrand or the sequence generation algorithm;

evaluating the integrand using the sequence of sample points and the probe array to produce corresponding integrand values without revealing the sequence of sample points to the user of the evaluation program; and obtaining a resulting integral solution based on the evaluation of the integrand using the sequence of sample points.

26. The method of claim 25 wherein the integral evaluation program is a valuation program for a financial instrument, wherein the integrand incorporates stochastic models and time variables and the resulting integral solution is a value of the financial instrument.

27. The method of claim 25 wherein the sequence generation program is an adaptive sequence program.

28. The method of claim 25 wherein the point and the sample points are a sequence of multi-dimensional vectors in a unit cube, the dimensions of the multi-dimensional unit cube being dependant on the integrand.

29. The method of claim 25 wherein the step of obtaining a resulting integral solution includes averaging the integrand values from the points in the sequence.

30. The method of claim 25 wherein the step of obtaining a resulting solution further comprises the steps of:

calculating a weighting factor for each integrand value from all the points in the sequence;

multiplying each integrand value by its respective weighting factor to obtain a weighted value; and wherein the resulting integral solution is obtained by adding the weighted values.

31. The method of claim 30 wherein the step of calculating a weighting factor is performed by using Simpson's Rule in one dimension.

32. The method of claim 30 wherein the step of obtaining a resulting solution is performed by the sequence generation program without revealing the calculating and multiplying steps to the user of the integral evaluation program.

33. The method of claim 26 wherein the step of obtaining a resulting integral solution further comprises the steps of:

creating a histogram distribution of the integrand values;

integrating the histogram distribution; and determining a value-at-risk point by calculating the integral value below which a preselected percentage of the integral values fall.

34. The method of claim 25 wherein the number of points in the further sample points stored in the probe array is greater than the number of points in the sequence.

35. The method of claim 25 further comprising the steps of:

encoding the probe array;

storing the encoded probe array; and decoding the encoded probe array for use by the sequence generation program.

36. The method of claim 35 wherein the step of encoding includes encrypting the probe array with a public key; and wherein the step of decoding includes decrypting the encrypted probe array with a private key.

37. The method of claim 35 further comprising the step of outputting the encoded probe array.

38. A system for accelerating an integral evaluation program having an integrand using the Monte Carlo method with a sequence generated by a sequence generation program having a proprietary sequence generation algorithm while preserving the secrecy of the sequence generation algorithm of the sequence generation program from a user of the system, the system comprising:

a storage device storing the integral evaluation program and the sequence generation program;

an integrand evaluation circuit coupled to the storage device and configured by the integrand program;

a sequence generation circuit coupled to the storage device and configured by the sequence generation program, the sequence generation circuit including:

an initial determination circuit which determines a point in a sequence generated by the sequence generation algorithm;

an evaluation circuit coupled to the storage device, the evaluation circuit being capable of: producing an integrand value by using the determined point; determines a sequence of sample points using the sequence generation algorithm by using the integrand value to obtain information about the integrand without revealing the integrand or the sequence generation algorithm; and evaluating the integrand using the sequence of sample points to produce corresponding integrand values without revealing the sequence of sample points to the user of the evaluation program.

39. The system of claim 38 wherein the sequence generation circuit further comprises an integral solution circuit coupled to the evaluation circuit, the integral solution circuit calculating an integral value based on the integrand values.

40. The system of claim 39 wherein the integral solution circuit averages the integrand values.

41. The system of claim 39 wherein the integrand solution circuit:
   calculates a weighting factor for each integral value from all the points in the sequence;
   multiplies each integrand value by its respective weighting factor to obtain a weighted value; and
   adds the weighted values.

42. The system of claim 41 wherein weighting factor is calculated by using Simpson's Rule in one dimension.

43. The system of claim 38 wherein the integral evaluation program is a valuation program for a financial instrument, wherein the integrand incorporates stochastic models and time variables and the integral values are values of the financial instrument.

44. The system of claim 43 further comprising a value-at-risk calculation circuit coupled to the evaluation circuit, the value-at-risk calculation circuit being capable of:
   creating a histogram distribution of the integrand values;
   integrating the histogram distribution; and
   determining a value-at-risk point by calculating the integral value below which a preselected percentage of the integral values fall.

45. The system of claim 38 wherein the sequence generation program is an adaptive sequence program.

46. The system of claim 39 further comprising an output device coupled to the integral solution circuit for outputing the integral value.

47. The system of claim 46 wherein the output device is a printer.

48. The system of claim 46 wherein the output device in a display screen.

* * * * *